(12) United States Patent
Baba

(10) Patent No.: US 7,667,901 B2
(45) Date of Patent: Feb. 23, 2010

(54) LENS UNIT

(75) Inventor: Tomohiko Baba, Kanagawa (JP)

(73) Assignee: Sony Corporation, Tokyo (JP)

( * ) Notice: Subject to any disclaimer, the term of this patent is extended or adjusted under 35 U.S.C. 154(b) by 190 days.

(21) Appl. No.: 11/711,403

(22) Filed: Feb. 27, 2007

(65) Prior Publication Data

US 2007/0217035 A1 Sep. 20, 2007

(30) Foreign Application Priority Data

Mar. 17, 2006 (JP) .............................. 2006-075531

(51) Int. Cl.
*G02B 13/18* (2006.01)
*G02B 9/62* (2006.01)
*G02B 9/60* (2006.01)

(52) U.S. Cl. .................. 359/717; 359/762; 359/764

(58) Field of Classification Search .................. 359/717, 359/740, 764, 793, 762

See application file for complete search history.

(56) References Cited

U.S. PATENT DOCUMENTS

2006/0028741 A1* 2/2006 Kreitzer et al. .............. 359/793
2006/0119959 A1* 6/2006 Yamaguchi et al. ......... 359/793

FOREIGN PATENT DOCUMENTS

JP 2005-227426 8/2005

* cited by examiner

*Primary Examiner*—William C Choi
(74) *Attorney, Agent, or Firm*—Robert J. Depke; Rockey, Depke & Lyons, LLC

(57) ABSTRACT

A lens unit includes a front group, a stop, and a rear group, in order from the object side toward the image side. The front group includes at least: a first lens having a negative meniscus shape; a negative second lens formed from a plastic and having an aspherical surface; and a positive third lens, in order from the object side toward the image side. The rear group includes at least: a positive first lens; and a negative second lens, in order from the object side toward the image side.

6 Claims, 3 Drawing Sheets

LENS UNIT

CROSS REFERENCES TO RELATED APPLICATIONS

The present invention contains subject matter related to Japanese Patent Application JP 2006-075531 filed with the Japanese Patent Office on Mar. 17, 2006, the entire contents of which being incorporated herein by reference.

BACKGROUND OF THE INVENTION

1. Field of the Invention

The present invention relates to a lens unit.

2. Description of the Related Art

As a lens unit, for example a fisheye lens unit, suitable for incorporation into an image pickup apparatus or the like having a small image pickup device, there has been known a fisheye lens unit having a total of four lenses, as for examples disclosed in Japanese Patent Laid-open No. 2005-227426 (hereinafter referred to as Patent Document 1).

SUMMARY OF THE INVENTION

However, in such a fisheye lens unit as disclosed in Patent Document 1, for obtaining excellent optical characteristics, the optical overall length should be enlarged to or above 15 mm. In addition, when it is tried to shorten the optical overall length, the radius of curvature $R_2$ of the image-side surface (second surface) of the first lens constituting the front group and the radius of a section of the image-side surface (second surface) of the first lens should be made substantially equal. Here, the radius of a section of the image-side surface (second surface) of the first lens, in view of the configuration in which the second surface of the first lens has a curved surface (radius of curvature: $R_2$) concaved to the object side and a peripheral flat part surrounding the curved surface, means the radius of the boundary (which is circular) between the curved surface and the peripheral flat part. Hereinafter, this expression will be used in the same meaning as just-mentioned. Besides, since the image-side surface (second surface) of the first lens constituting the front group should be made substantially hemispherical, the workability of the first lens is poor, and the manufacturing cost is raised, making the lens unit unsuitable for mass production.

Thus, there is a necessity to provide a lens unit in which the optical overall length can be made smaller, it is unnecessary for the image-side surface (second surface) of a first lens constituting a front group to be made hemispherical, and the manufacturing cost of the first lens can be restrained from being raised, and which is suited to mass production.

According to one embodiment of the present invention, there is provided a lens unit including a front group, a stop, and a rear group, in order from an object side toward an image side, wherein the front group including at least:
a first lens having a negative meniscus shape;
a negative second lens made from a plastic and
having an aspherical surface; and
a positive third lens,
in order from the object side toward the image side, and
the rear group including at least:
a positive first lens; and
a negative second lens,
in order from the object side toward the image side.

In the lens unit according to one embodiment of the present invention, the front group may further include a fourth lens on the image side relative to the third lens in the front group. Incidentally, such a configuration will sometimes be referred to as the lens unit according to a first mode of the present invention, for convenience.

Or, in the lens unit according to one embodiment of the present invention, the rear group may further include a positive third lens made from a plastic and having an aspherical surface, on the image side relative to the second lens in the back group. Incidentally, such a configuration will sometimes be referred to as the lens unit according to a second mode of the present invention, for convenience.

In the lens unit according to one embodiment of the present invention inclusive of the first and second modes, the following condition $0.5 < |F_{f1}/T| < 0.7$, preferably $0.55 < |F_{f1}/T| < 0.65$, is satisfied, where $F_{f1}$ represents a focal length of the first lens included in the front group, and T represents an optical overall length of the lens unit. Incidentally, the optical overall length (T) of the lens unit means the distance from the most-object-side portion of the first lens constituting the front group to the image forming plane.

Further, in the lens unit, the following condition $v_{d-f3} < 28$, preferably $v_{d-3f} < 25$, is satisfied, where $v_{d-3f}$ represents an Abbe number of the third lens included the front group. With the Abbe number $v_{d-3f}$ of the third lens constituting the front group set in such a range, chromatic aberration can be reduced. Besides, in general, an optical glass having a small Abbe number $v_{d-f3}$ is characterized by its high refractive index $n_d$ at the d-line (wavelength: 585 nm), and the large value of $n_d$ makes it possible to reduce the Petzval sum.

Furthermore, in the lens unit, the following condition $D_2/R_2 < 1.9$, preferably $D_2/R_2 < 1.85$, is satisfied, where $R_2$ (unit: mm) represents a radius of curvature at an intersection with an optical axis of an image-side surface (second surface) of the first lens included in the front group, and $D_2$ (unit: mm) represents a diameter of a section of the image-side surface (second surface) of the first lens included in the front group. Incidentally, the value of $D_2/R_2$ is a yardstick in mass-producing the lens at low cost, and, when the relationship of $D_2/R_2 < 1.9$ is satisfied, the lens can be mass-produced inexpensively.

In the lens unit according to the first mode of the present invention including the various preferred configurations as above-mentioned, the negative second lens constituting the front group may be configured by use of any of a concavo-concave lens, a plano-concave lens, and a convexo-concave lens; the positive third lens constituting the front group may be configured by use of any of a convexo-convex lens, a plano-convex lens, and a concavo-convex lens; and the fourth lens constituting the front group may be configured by use of any of a concavo-concave lens, a plano-concave lens, a convexo-concave lens, a convexo-convex lens, a plano-convex lens, and a concavo-convex lens. On the other hand, the positive first lens constituting the rear group may be configured by use of any of a convexo-convex lens, a plano-convex lens, and a concavo-convex lens; and the negative second lens constituting the back group may be configured by use of any of a concavo-concave lens, a plano-concave lens, and a convexo-concave lens. Incidentally, preferred combinations of the shapes of the lenses (the first, second, third and fourth lenses) constituting the front group and preferred combinations of the shapes of the lenses (the first and second lenses) constituting the rear group are given in Table 1 below. Incidentally, in Table 1 and Table 2 shown later, "convex" means a convex lens, and "concave" means a concave lens.

TABLE 1

[First Mode of the Invention]

Front group

| | | | | | | | |
|---|---|---|---|---|---|---|---|
| First Lens | Convexo-concave | Convexo-concave | Convexo-concave | Convexo-concave | Convexo-concave | Convexo-concave | Convexo-concave |
| Second Lens | Convexo-concave | Convexo-concave | Convexo-concave | Concavo-concave | Convexo-concave | Concavo-concave | Concavo-Concave |
| Third Lens | Concavo-convex | Concavo-convex | Convexo-convex | Concavo-convex | Concavo-convex | Concavo-convex | Convexo-Convex |
| Fourth lens | Concavo-convex | Concavo-convex | Concavo-convex | Concavo-convex | Convexo-concave | Convexo-concave | Convexo-Concave |

Rear group

| | | | | | | | |
|---|---|---|---|---|---|---|---|
| First Lens | Convexo-convex | Convexo-convex | Convexo-convex | Convexo-convex | Convexo-convex | Convexo-convex | Convexo-convex |
| Second lens | Convexo-concave | Concavo-concave | Convexo-concave | Convexo-concave | Convexo-concave | Convexo-concave | Convexo-Concave |

On the other hand, in the lens unit according to the second mode of the present invention inclusive of the various preferred configurations as above-mentioned, the negative second lens constituting the front group may be configured by use of any of a concavo-concave lens, a plano-concave lens, and a convexo-concave lens; and the positive third lens constituting the front group may be configured by use of any of a convexo-convex lens, a plano-convex lens, and a concavo-convex lens. In addition, the positive first lens constituting the rear group may be configured by use of any of a convexo-convex lens, a plano-convex lens, and a concavo-convex lens; the negative second lens constituting the back group may be configured by use of any of a concavo-concave lens, a plano-concave lens, and a convexo-concave lens; and the positive third lens constituting the back group may be configured by use of any of a convexo-convex lens, a plano-convex lens, and a concavo-convex lens. Incidentally, preferred combinations of the shapes of the lenses (the first, second and third lenses) constituting the front group and preferred combinations of the shapes of the lenses (the first, second and third lenses) constituting the back group are given in Table 2 below.

Lens Unit According to First Mode of the Invention $R_1$: the radius of curvature (unit: mm) at the intersection with the optical axis of the object-side surface (first surface) of the first lens constituting the front group $R_2$: the radius of curvature (unit: mm) at the intersection with the optical axis of the image-side surface (second surface) of the first lens constituting the front group $R_3$: the radius of curvature (unit: mm) at the intersection with the optical axis of the object-side surface (third surface) of the second lens constituting the front group $R_4$: the radius of curvature (unit: mm) at the intersection with the optical axis of the image-side surface (fourth surface) of the second lens constituting the front group $R_5$: the radius of curvature (unit: mm) at the intersection with the optical axis of the object-side surface (fifth surface) of the third lens constituting the front group

TABLE 2

[Second Mode of the Invention]

Front group

| | | | | | | | |
|---|---|---|---|---|---|---|---|
| First lens | Convexo-concave | Convexo-concave | Convexo-concave | Convexo-concave | Convexo-concave | Convexo-concave | Convexo-concave |
| Second lens | Convexo-concave | Convexo-concave | Convexo-concave | Concavo-concave | Convexo-concave | Concavo-concave | Concavo-concave |
| Third lens | Concavo-convex | Concavo-convex | Convexo-convex | Concavo-convex | Concavo-convex | Concavo-convex | Convexo-convex |

Rear group

| | | | | | | | |
|---|---|---|---|---|---|---|---|
| First lens | Convexo-convex | Concavo-convex | Concavo-convex | Concavo-convex | Convexo-convex | Convexo-convex | Convexo-convex |
| Second lens | Concavo-concave | Concavo-concave | Concavo-concave | Concavo-concave | Convexo-concave | Concavo-concave | Convexo-concave |
| Third lens | Convexo-convex | Convexo-convex | Convexo-convex | Convexo-convex | Convexo-convex | Convexo-convex | Convexo-convex |

Here, symbols and the like to be used in the following description are defined as follows. Incidentally, the sign of the value of the curvature of a curved surface having a vertex (intersection with the optical axis) on the object side will be positive, and the sign of the value of the curvature of a curved surface having a vertex (intersection with the optical axis) on the image side will be negative.

$R_6$: the radius of curvature (unit: mm) at the intersection with the optical axis of the image-side surface (sixth surface) of the third lens constituting the front group $R_7$: the radius of curvature (unit: mm) at the intersection with the optical axis of the object-side surface (seventh surface) of the fourth lens constituting the front group $R_8$: the radius of curvature (unit: mm) at the intersection with the optical axis of the image-side surface (eighth surface) of the fourth lens constituting the front group $R_9$: the radius of curvature (unit: mm) at the intersection with the optical axis of the object-side surface (ninth surface) of the first lens constituting the rear group $R_{10}$: the radius of curvature (unit: mm) at the intersection with the optical axis of the image-side surface (tenth surface) of the first lens constituting the rear group $R_{11}$: the radius of curvature (unit: mm) at the intersection with the optical axis of the object-side surface (eleventh surface) of the second lens constituting the rear group $R_{12}$: the radius of curvature (unit: mm) at the intersection with the optical axis of the image-side surface (twelfth surface) of the second lens constituting the rear group Lens Unit According to Second Mode of the Invention $R_1$: the radius of curvature (unit: mm) at the intersection with the optical axis of the object-side surface (first surface) of the first lens constituting the front group $R_2$: the radius of curvature (unit: mm) at the intersection with the optical axis of the image-side surface (second surface) of the first lens constituting the front group $R_3$: the radius of curvature (unit: mm) at the intersection with the optical axis of the object-side surface (third surface) of the second lens constituting the front group $R_4$: the radius of curvature (unit: mm) at the intersection with the optical axis of the image-side surface (fourth surface) of the second lens constituting the front group $R_5$: the radius of curvature (unit: mm) at the intersection with the optical axis of the object-side surface (fifth surface) of the third lens constituting the front group $R_6$: the radius of curvature (unit: mm) at the intersection with the optical axis of the image-side surface (sixth surface) of the third lens constituting the front group $R_7$: the radius of curvature (unit: mm) at the intersection with the optical axis of the object-side surface (seventh surface) of the first lens constituting the rear group $R_8$: the radius of curvature (unit: mm) at the intersection with the optical axis of the image-side surface (eighth surface) of the first lens constituting the rear group $R_9$: the radius of curvature (unit: mm) at the intersection with the optical axis of the object-side surface (ninth surface) of the second lens constituting the rear group $R_{10}$: the radius of curvature (unit: mm) at the intersection with the optical axis of the image-side surface (tenth surface) of the second lens constituting the rear group $R_{11}$: the radius of curvature (unit: mm) at the intersection with the optical axis of the object-side surface (eleventh surface) of the third lens constituting the rear group $R_{12}$: the radius of curvature (unit: mm) at the intersection with the optical axis of the image-side surface (twelfth surface) of the third lens constituting the rear group Lens Units According to First and Second Mode of the Invention f: focal length (unit: mm) of whole system
$F_{no}$: F value (f-number)
ω: half angle of view (unit: °)
d: lens thickness or lens spacing (unit: mm) on optical axis
$n_d$: refractive index at d-line (wavelength: 585 nm)
$v_d$: Abbe number at d-line (wavelength: 585 nm)

In the lens unit according to one embodiment of the present invention inclusive of the preferred modes and configurations as above-mentioned, a transparent glass-made protective plate may be provided on the object side relative to the front group, for protection of the lens unit. In addition, a parallel flat surface plate functioning as an infrared cut filter, a low-pass filter, a protective member or the like may be disposed on the image-side relative to the rear group.

Examples of the plastic(s) constituting the plastic lenses include thermoplastic resins such as acrylic resins, polycarbonate resins, polyolefin resins, polyester resins, polyurethane resins, polysulfone resins, polystyrene resins, vinyl resins, halogen-containing resins, etc. and thermosetting resins such as epoxy resins, polyimide resins, urea resins, phenol resins, silicone resins, etc. Though depending on the material, the plastic lenses can be formed by injection molding, for example.

The lens unit according to one embodiment of the present invention is suited to incorporation into an image pickup apparatus having a small-type image pickup, device such as, for example, cellular phones, PDAs (Personal Digital Assistants), personal computers, automobiles, game apparatuses, monitor cameras, etc.

In the lens unit according to one embodiment of the present invention, spherical glass-made lenses having high refractive indices may be combined with aspherical plastic lenses having low refractive indices, and aberrations may be corrected appropriately, whereby it is possible to provide a lens unit with a smaller optical overall length. Besides, in a fisheye lens unit according to the related art, the curvature of the image-side surface of the first lens constituting the front group and the radius of a section of the image-side surface of the first lens should be substantially equal, so that the workability of the first lens is poor, and the manufacturing cost is increased, leading to unsuitableness for mass production. On the other hand, in the lens unit according to one embodiment of the present invention, combining the spherical glass lenses having high refractive indices with the aspherical plastic lenses having low refractive indices makes it possible to set the power distribution in the whole lens unit with a high degree of freedom. Therefore, the power of the first lens constituting the front group can be set lower, whereby the just-mentioned problem in the related art can be solved. In addition, since the first lens constituting the front group can be configured by use of a lens more excellent in workability, the lens unit can be mass-produced at a low production cost. Furthermore, since the lens unit can be configured, for example, by use of two spherical glass lenses and four plastic lenses which are excellent in mass-producibility, high productivity and a low manufacturing cost can be realized. Besides, a light lens unit with good correction of optical aberrations can be realized.

DETAILED DESCRIPTION OF THE PREFERRED EMBODIMENTS

Figure 1A:
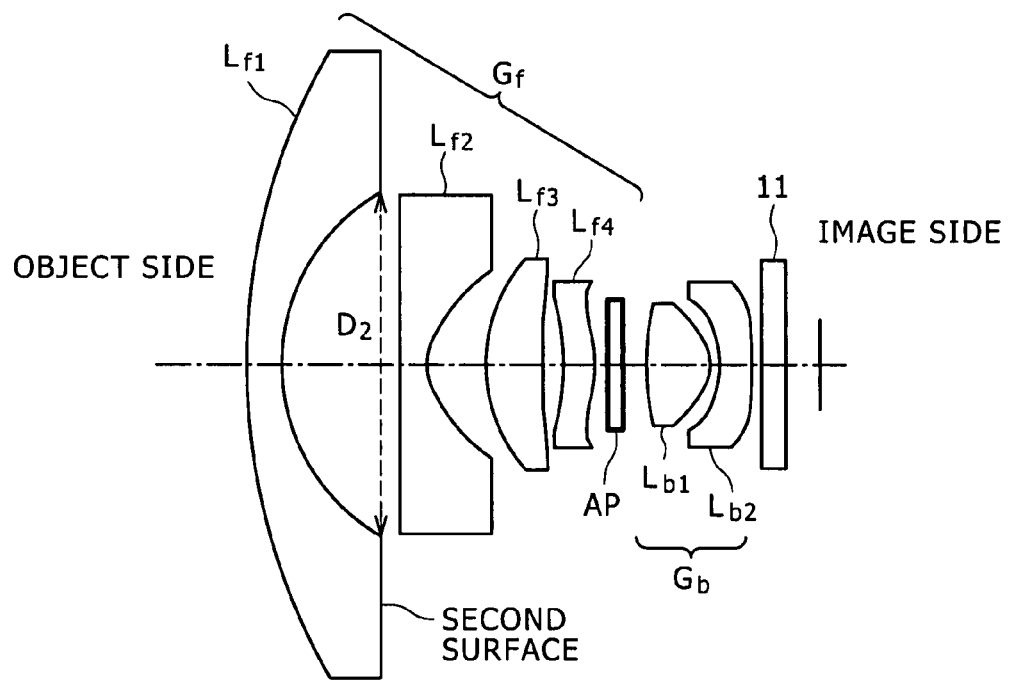
FIGS. 1A and 1B are conceptual diagrams of lens units according to Embodiments 1 and 2, respectively.

Now, the present invention will be described based on embodiments thereof, referring to the drawings. It is to be noted, however, that the invention is not limited to the embodiments, and various numerical values and materials in the embodiments are merely given for exemplification.

Embodiment 1

Embodiment 1 pertains to a lens unit according to one embodiment of the present invention, specifically a lens unit according to the first mode of the invention, more particularly a fisheye lens unit. A conceptual diagram of the lens unit according Embodiment 1 is shown in FIG. 1A. The lens unit in Embodiment 1 is a 2-group 6-lens lens unit, which includes a front group $G_f$ of lenses, a stop AP, and a back group $G_b$ of lenses, in this order from the object side toward the image side. The front group $G_f$ includes:

(A-1) a first lens $L_{f1}$ having a negative (having negative power) meniscus shape;

(A-2) a negative (having negative power) second lens $L_{f2}$ formed from a plastic and having an aspherical surface;

(A-3) a positive (having positive power) third lens $L_{f3}$; and (A-4) a positive (having positive power) fourth lens $L_{f4}$, in this order from the object side toward the image side.

In addition, the back group $G_b$ includes:

(B-1) a positive (having positive power) first lens $L_{b1}$; and (B-2) a negative (having negative power) second lens $L_{b2}$, in this order from the object side toward the image side.

The first lens $L_{f1}$ and the third lens $L_{f3}$ constituting the front group $G_f$ are each configured by use of a spherical lens, whereas the second lens $L_{f2}$ and the fourth lens $L_{f4}$ constituting the front group $G_f$ as well as the first lens $L_{b1}$ and the second lens $L_{b2}$ constituting the back group $G_b$ are each configured by use of an aspherical lens. In addition, for protection of the lens unit, a transparent glass-made protective plate (not shown) is provided on the object side relative to the front group $G_f$, and, further, a parallel flat surface plate 11 is disposed on the image side relative to the back group $G_b$. Incidentally, the combination of the shapes of the <first lens, second lens, third lens, fourth lens>constituting the front group $G_f$ of lenses in Embodiment 1 is <convexo-concave lens, convexo-concave lens, concavo-convex lens, concavo-convex lens>. On the other hand, the combination of the shapes of the <first lens, second lens>in the back group $G_b$ of lenses is <convexo-convex lens, convexo-concave lens>.

Here, in Embodiment 1, the relationship:

0.5<|$F_{f1}$/T|<0.7 is satisfied, where $F_{f1}$ is the focal length of the first lens $L_{f1}$ constituting the front group $G_f$, and T is the optical overall length of the lens unit. Specifically, $F_{f1}$=6.90 (mm), T=11.4 (mm).

In addition, the relationship:

$v_{d-f3}$<28 is satisfied, where $V_{d-f3}$ is the Abbe number of the third lens $L_{f3}$ constituting the front group $G_f$. To be more specific, $v_{d-f3}$=18.9.

Further, the relationship:

$D_2/R_2$<1.9 is satisfied, where $R_2$ (unit: mm) is the radius of curvature at the intersection with the optical axis of the image-side surface (second surface) of the first lens $L_{f1}$ constituting the front group $G_f$, and $D_2$ (unit: mm) is the diameter of a section of the image-side surface (second surface) of the first lens $L_{f1}$ constituting the front group $G_f$. Specifically, $D_2$=7.01 (mm), $R_2$=3.818 (mm).

Figure 2A:
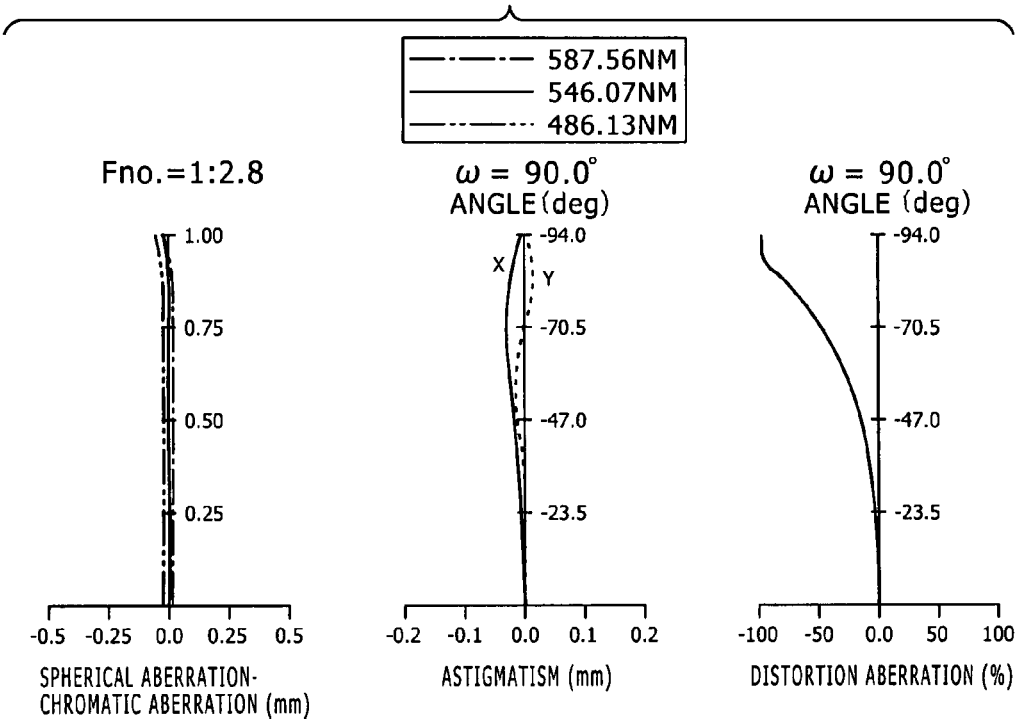
FIGS. 2A and 2B show graphs showing the measurement results of spherical aberration-chromatic aberration, astigmatism, and distortion aberration, for the lens units according to Embodiments 1 and 2, respectively.

Furthermore, the specifications of the lens unit in Embodiment 1 are shown in Table 3 below, and the parameters of the aspherical surfaces constituting the lens surfaces are given in Table 4 below. Aberration diagrams of the lens unit in Embodiment 1 are shown in FIG. 2A. Here, in FIG. 2A or FIG. 2B and in FIG. 3B, spherical aberration-chromatic aberration, astigmatism, and distortion aberration are shown.

Incidentally, an aspherical surface can generally be expressed by the following equation (1). Here, X is the distance by which a coordinate point on an aspherical surface at a height Y from the optical axis is spaced from a tangential plane at the vertex of the aspherical surface (the intersection between the surface of a lens constituting the lens unit and the optical axis), and c is the curvature (1/r) at the vertex of the aspherical surface. In addition, "K" is called also the conic constant; in general, the equation (1) represents a spherical surface in the case where K=0, a paraboloid in the case where K=−1, a hyperboloid in the case where K<−1, an ellipsoid (an ellipsoid obtained by rotating an ellipse about its major axis) in the case where −1<K<0, and represents an ellipsoid (an ellipsoid obtained by rotating an ellipse about its minor axis) in the case where 0<K.

$$X = \frac{cY^2}{1+\sqrt{1-c^2Y^2(1+K)}} + AY^4 + BY^6 + CY^8 + DY^{10} \qquad (1)$$

TABLE 3

(Embodiment 1)

| Focal length (f) | 0.89 mm |
| F-number ($F_{no}$) | 2.8 |
| Half angle of view (ω) | 94° |
| Lens overall length | 11.4 mm |

| Surface No. | R (mm) | d (mm) | $n_d$ | $v_d$ |
|---|---|---|---|---|
| 1 | 11.95 | 0.700 | 1.83 | 42.7 |
| 2 | 3.818 | 2.320 | | |
| 3 | 142.7 | 0.600 | 1.53 | 55.8 |
| 4 | 1.295 | 1.119 | | |
| 5 | 3.131 | 1.110 | 1.92 | 18.9 |
| 6 | 13.26 | 0.432 | | |
| 7 | −4.800 | 0.600 | 1.53 | 55.8 |
| 8 | −2.826 | 0.523 | | |
| 9 | 3.641 | 1.035 | 1.53 | 55.8 |
| 10 | −0.807 | 0.214 | | |
| 11 | −1.460 | 0.602 | 1.58 | 29.0 |
| 12 | −13.69 | | | |

TABLE 4

(Embodiment 1)

| Surface No. | K | A | B | C | D |
|---|---|---|---|---|---|
| 3 | −10.00 | −0.422 × 10$^{-3}$ | 0.000 × 10$^{+0}$ | 0.000 × 10$^{+0}$ | 0.000 × 10$^{+0}$ |
| 4 | −1.375 | −0.589 × 10$^{-2}$ | 0.000 × 10$^{+0}$ | 0.000 × 10$^{+0}$ | 0.000 × 10$^{+0}$ |
| 7 | 1.901 | −0.548 × 10$^{-2}$ | 0.115 × 10$^{-1}$ | −0.112 × 10$^{-2}$ | −0.270 × 10$^{-5}$ |
| 8 | −10.00 | 0.601 × 10$^{-1}$ | 0.182 × 10$^{-2}$ | 0.653 × 10$^{-2}$ | −0.875 × 10$^{-3}$ |
| 9 | −9.900 | −0.607 × 10$^{-1}$ | 0.923 × 10$^{-1}$ | −0.676 × 10$^{-1}$ | 0.243 × 10$^{-1}$ |
| 10 | −2.565 | −0.116 × 10$^{+0}$ | 0.192 × 10$^{-1}$ | 0.340 × 10$^{-4}$ | 0.515 × 10$^{-2}$ |
| 11 | −8.845 | −0.726 × 10$^{-1}$ | −0.163 × 10$^{-1}$ | −0.418 × 10$^{-2}$ | −0.144 × 10$^{-3}$ |
| 12 | −1.264 | −0.185 × 10$^{-1}$ | −0.283 × 10$^{-2}$ | −0.463 × 10$^{-2}$ | 0.954 × 10$^{-3}$ |

In Embodiment 1, the materials constituting the first lens $L_{f1}$, the second lens $L_{f2}$, the third lens $L_{f3}$, and the fourth lens $L_{f4}$ in the front group $G_f$ are set to be a glass (first lens $L_{f1}$), a polyolefin resin (second lens $L_{f2}$), a glass (third lens $L_{f3}$), and a polyolefin resin (fourth lens $L_{f4}$), respectively, whereas the materials constituting the first lens $L_{b1}$ and the second lens $L_{b2}$ in the back group $G_b$ are set to be a polyolefin resin (first lens $L_{b1}$) and a polycarbonate resin (second lens $L_{b2}$), respectively.

In the lens unit in Embodiment 1, a half angle of view (ω) of 94 degrees is realized, an f-number ($F_{no}$) is as light as 2.8, and a lens unit as short as an optical overall length (T) of 11.4 mm is realized. Here, in the lens unit in Embodiment 1, the absolute value ($|F_{f1}/T|$) of the ratio of the focal length $F_{f1}$ of the first lens $L_{f1}$ constituting the front group $G_f$ to the optical overall length (T) is as high as 0.605, so that the optical overall length (T) is sufficiently short as compared with the focal length $F_{f1}$ of the first lens $L_{f1}$ constituting the front group $G_f$. Moreover, the image-side surface (second surface) of the first lens $L_{f1}$ constituting the front group $G_f$ has a sufficiently shallow surface shape, as contrasted to the nearly hemispherical shape in the lens unit according to the related art. Specifically, the sectional shape of the image-side surface (second surface) obtained by cutting the first lens $L_{f1}$ of the front group $G_f$ along a virtual plane containing the optical axis is a segment (bow-like shape) with a length of chord of $D_2$, which promises good workability, making it possible to mass-produce the first lens $L_{f1}$ inexpensively. In addition, the second lens $L_{f2}$ constituting the front group $G_f$ is an aspherical plastic lens, which can be manufactured at low cost and has an efficient negative lens effect. Further, the third lens $L_{f3}$ constituting the front group $G_f$ is configured by use of a spherical glass lens having a high refractive index and a small Abbe number, and is effective for reducing the Petzval sum. Besides, the fourth lens $L_{f4}$ constituting the front group $G_f$ is configured by use of an aspherical plastic lens, which can be manufactured at low const and promises efficient correction of aberrations. Moreover, since the back group $G_b$ is configured by use of the positive first lens $L_{b1}$ having a large Abbe number and the negative second lens $L_{b2}$ having a small Abbe number, a positive lens effect as a whole is obtained while correcting chromatic aberration.

Figure 3A:
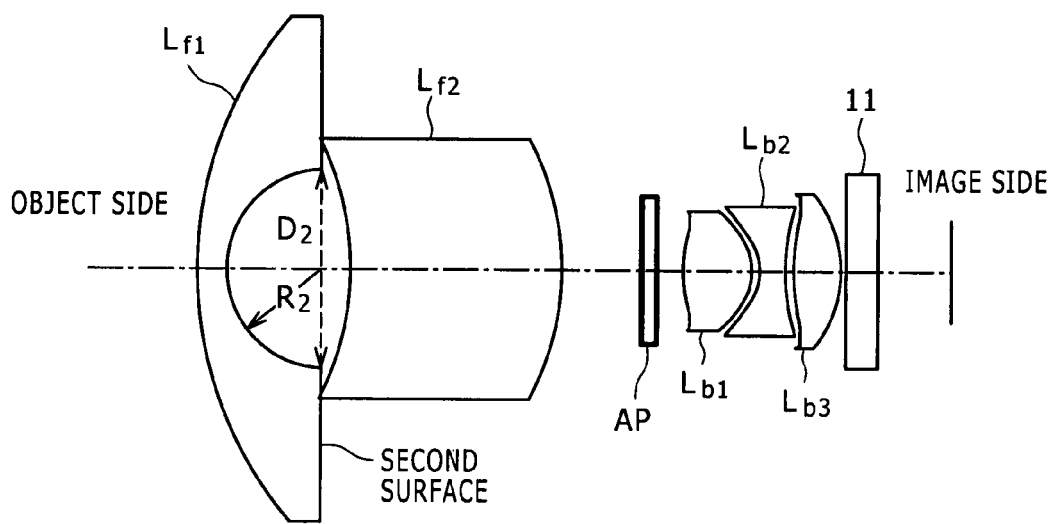
FIG. 3A is a conceptual diagram of a lens unit according to a comparative example.
Figure 3B:
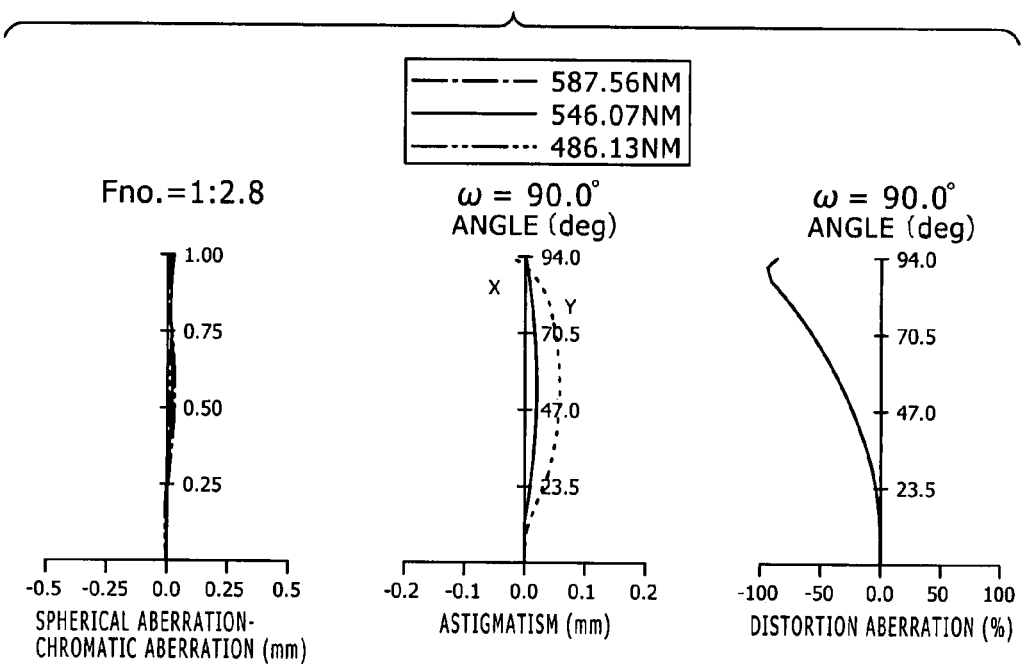
FIG. 3B shows graphs showing the measurement results of spherical aberration-chromatic aberration, astigmatism, and distortion aberration for the lens unit according to the comparative example.

For comparison, a fisheye lens unit configured by use of a total of five lenses, two lenses in the front group and three lenses in the back group, as shown in FIG. 3A is designed (this lens unit will be referred to as Comparative Example). Incidentally, in FIG. 3A, reference number 11 denotes a parallel flat surface plate. Aberration diagrams of the lens unit in Comparative Example are shown in FIG. 3B.

In order to obtain optical characteristics equivalent to those of the lens unit in Embodiment 1, the lens unit in Comparative Example should be so configured that the optical overall length (T) is 18 mm and that the image-side surface (second surface) of the first lens $L_{f1}$ constituting the front group is substantially hemispherical in shape, which leads to poor workability of the first lens $L_{f1}$ and an increase in the manufacturing cost. Thus, Comparative Example is not suited to mass production.

Embodiment 2

Figure 1B:
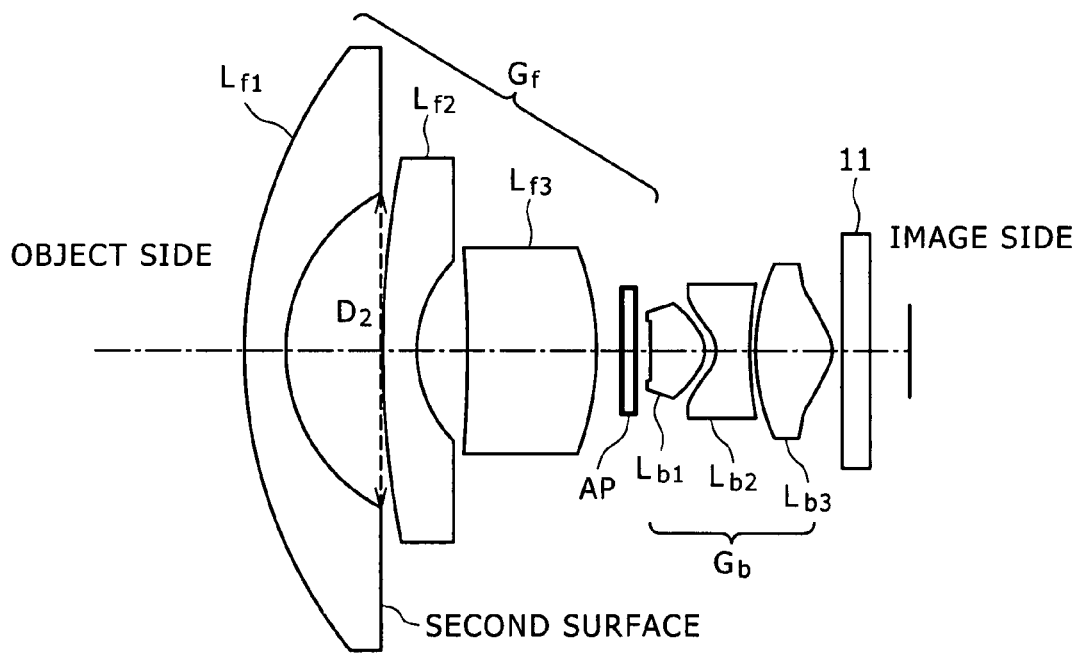

Embodiment 2 is a modification of Embodiment 1, and pertains to a lens unit, specifically a fisheye lens unit, according to the second mode of the present invention. A conceptual diagram of the lens unit in Embodiment 2 is shown in FIG. 1B. The lens unit in Embodiment 2, also, is a 2-group 6-lens lens unit including a front group $G_f$ of lenses, a stop AP, and a back group $G_b$ of lenses, in this order from the object side toward the image side. The front group $G_f$ includes:

(A-1) a first lens $L_{f1}$ having a negative (having negative power) meniscus shape;

(A-2) a negative (having negative power) second lens $L_{f2}$ formed from a plastic and having an aspherical surface; and (A-3) a positive (having positive power) third lens $L_{f3}$, in this order from the object side toward the image side.

In addition, the back group $G_b$ includes:

(B-1) a positive (having positive power) first lens $L_{b1}$;

(B-2) a negative (having negative power) second lens $L_{b2}$; and (B-3) a positive (having positive power) third lens $L_{b3}$.

The first lens $L_{f1}$ and the third lens $L_{f3}$ constituting the front group $G_f$ are each configured by use of a spherical lens, whereas the second lens $L_{f2}$ constituting the front group $G_f$ and the first lens $L_{b1}$, the second lens $L_{b2}$ and the third lens $L_{b3}$ constituting the back group $G_b$ are each configured by use of an aspherical lens. In addition, for protection of the lens unit, a transparent glass-made protective plate (not shown) is provided on the object side relative to the front group $G_f$, and, further, a parallel flat surface plate 11 is disposed on the image side relative to the back group $G_b$. Incidentally, the combination of the shapes of the <first lens, second lens, third lens>constituting the front group $G_f$ in Embodiment 2 is <convexo-concave lens, convexo-concave lens, concavo-convex lens>. On the other hand, the combination of the shapes of the <first lens, second lens, third lens>constituting the back group $G_b$ is <convexo-convex lens, concavo-concave lens, convexo-convex lens>.

Here, in Embodiment 2, the relationship:

$$0.5 < |F_{f1}/T| < 0.7$$

is satisfied, where $F_{f1}$ is the focal length of the first lens $L_{f1}$ in the front group $G_f$ and T is the optical overall length of the lens unit. Specifically, $F_{f1}$=6.90 (mm),
T=11.4 (mm).

In addition, the relationship:

$$\nu_{d\text{-}f3} < 28$$

is satisfied, where $\nu_{d\text{-}f3}$ is the Abbe number of the third lens $L_{f3}$ in the front group $G_f$. Specifically,
$\nu_{d\text{-}f3}$=18.9.

Furthermore, the relationship:

$$D_2/R_2 < 1.9$$

is satisfied, where $R_2$ (unit: mm) is the radius of curvature at the intersection with the optical axis of the image-side surface (second surface) of the first lens $L_{f1}$ in the front group $G_f$, and $D_2$ (unit: mm) is the diameter of a section of the image-side surface (second surface) of the first lens $L_{f1}$ in the front group $G_f$. To be more specific,
$D_2$=5.580 (mm),
$R_2$=3.049 (mm).

Figure 2B:
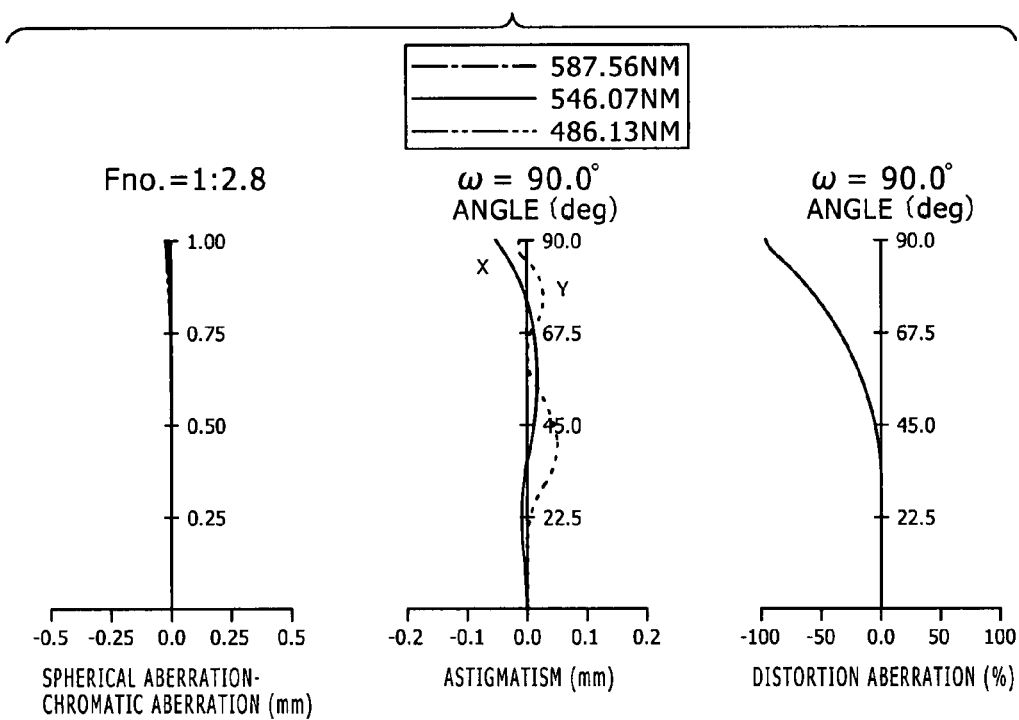

Furthermore, the specifications of the lens unit in Embodiment 2 are shown in Table 5 below, and the parameters of aspherical surfaces constituting the lens surfaces are given in Table 6 below. Besides, aberration diagrams of the lens unit in Embodiment 2 are shown in FIG. 2B.

TABLE 5

(Embodiment 2)

| | | |
|---|---|---|
| Focal length (f) | | 0.89 mm |
| F-number ($F_{no}$) | | 2.8 |
| Half angle of view ($\omega$) | | 94° |
| Lens overall length | | 11.4 mm |

| Surface No. | R (mm) | d (mm) | $n_d$ | $\nu_d$ |
|---|---|---|---|---|
| 1 | 8.253 | 0.700 | 1.80 | 46.6 |
| 2 | 3.049 | 1.664 | | |
| 3 | 12.84 | 0.600 | 1.53 | 55.8 |
| 4 | 2.470 | 0.883 | | |
| 5 | −15.20 | 2.236 | 1.92 | 18.9 |
| 6 | −5.290 | 0.913 | | |
| 7 | 8.855 | 0.960 | 1.58 | 59.4 |
| 8 | −0.583 | 0.194 | | |
| 9 | −0.513 | 0.600 | 1.58 | 29.0 |
| 10 | 8.150 | 0.100 | | |
| 11 | 5.504 | 1.30 | 1.53 | 55.8 |
| 12 | −0.814 | | | |

TABLE 6

(Embodiment 2)

| Surface No. | K | A | B | C | D |
|---|---|---|---|---|---|
| 3 | −20.00 | $0.000 \times 10^{+0}$ | $0.000 \times 10^{+0}$ | $0.000 \times 10^{+0}$ | $0.000 \times 10^{+0}$ |
| 4 | 0.870 | $-0.243 \times 10^{-2}$ | $-0.136 \times 10^{-2}$ | $-0.473 \times 10^{-3}$ | $0.365 \times 10^{-3}$ |
| 7 | 13.36 | $-0.239 \times 10^{+0}$ | $0.155 \times 10^{+0}$ | $-0.259 \times 10^{+1}$ | $0.473 \times 10^{+1}$ |
| 8 | −2.089 | $-0.212 \times 10^{+0}$ | $0.538 \times 10^{-1}$ | $-0.169 \times 10^{+0}$ | $0.734 \times 10^{-1}$ |
| 9 | −1.789 | $0.624 \times 10^{-1}$ | $0.257 \times 10^{-1}$ | $0.408 \times 10^{+0}$ | $-0.342 \times 10^{+0}$ |
| 10 | −20.00 | $-0.733 \times 10^{-1}$ | $0.505 \times 10^{-1}$ | $0.247 \times 10^{-1}$ | $-0.165 \times 10^{-1}$ |
| 11 | −17.22 | $0.330 \times 10^{-1}$ | $-0.292 \times 10^{-2}$ | $0.403 \times 10^{-2}$ | $-0.294 \times 10^{-2}$ |
| 12 | −1.296 | $0.110 \times 10^{+0}$ | $0.275 \times 10^{-1}$ | $-0.694 \times 10^{-2}$ | $-0.181 \times 10^{-2}$ |

In Embodiment 2, the materials constituting the first lens $L_{f1}$, the second lens $L_{f2}$, and the third lens $L_{f3}$ in the front group $G_f$ are set to be a glass (first lens $L_{f1}$), a polyolefin resin (second lens $L_{f2}$), and a glass (third lens $L_{f3}$), respectively, and the materials constituting the first lens $L_{b1}$, the second lens $L_{b2}$, and the third lens $L_{b3}$ in the back group $G_b$ are set to be a glass (first lens $L_{b1}$), a polycarbonate resin (second lens $L_{b2}$), and a polyolefin resin (third lens $L_{b3}$), respectively.

In the lens unit in Embodiment 2, also, a half angle of view ($\omega$) of 94 degrees is realized, an f-number ($F_{no}$) is as light as 2.8, and a lens unit having an optical overall length (T) as short as 11.4 mm is realized. Here, in the lens unit in Embodiment 2, also, the absolute value ($|F_{f1}/T|$) of the ratio of the focal length $F_{f1}$ of the first lens $L_{f1}$ in the front group $G_f$ to the optical overall length (T) is as high as 0.605, so that the optical overall length (T) is sufficiently short as compared with the focal length $F_{f1}$ of the first lens $L_{f1}$ constituting the front group $G_f$. Moreover, the image-side surface (second surface) of the first lens $L_{f1}$ constituting the first group $G_f$ has a sufficiently shallow surface shape, as contrasted to the nearly spherical shape in the lens unit according to the related art. Specifically, the sectional shape of the image-side surface (second surface) obtained by cutting the first lens $L_{f1}$ of the front group $G_f$ along a virtual plane containing the optical axis is a segment (bow-like shape) with a length of chord of $D_2$, so that the first lens $L_{f1}$ is good in workability and can be mass-produced inexpensively. In addition, the second lens $L_{f2}$ in the front group $G_f$ is an aspherical plastic lens, which can be manufactured at low cost and has an efficient negative lens effect. Further, the third lens $L_{f3}$ constituting the front group $G_f$ is configured by use of a spherical glass lens with a high refractive index and a large Abbe number, which is effective for reducing the Petzval sum. Moreover, the back group $G_b$ is configured by use of the positive first lens $L_{b1}$ having a large Abbe number, the negative second lens $L_{b2}$ having a small Abbe number, and the positive third lens $L_{b3}$ having a large Abbe number; therefore, a positive lens effect as a whole is obtained while correcting chromatic aberration, and good correction of aberrations is achieved.

It should be understood by those skilled in the art that various modifications, combinations, sub-combinations and alterations may occur depending on design requirements and other factors insofar as they are within the scope of the appended claims or the equivalents thereof.

What is claimed is:

1. A lens unit for a camera imaging device comprising a front group, a stop, and a rear group, in order from an object that is to be imaged side toward an image side, wherein
said front group including at least:
a first lens having a negative meniscus shape;
a negative second lens made from a plastic and having an aspherical surface; and
a positive third lens, in order from the object side toward the image side, and said rear group including at least:
a positive first lens being the closest member of the second group to an object side; and
a negative second lens, in order from the object side toward the image side.

2. The lens unit as set forth in claim 1, wherein said front group further includes a fourth lens on the image side relative to said third lens.

3. The lens unit as set forth in claim 1, wherein said rear group further includes a positive third lens made from a plastic and having an aspherical surface, on the image side relative to said second lens.

4. A lens unit as set forth in claim 1, satisfying the following condition:

$$0.5<|F_{f1}/T|<0.7$$

where $F_{f1}$ represents a focal length of said first lens included in said front group, and T represents an optical overall length of said lens unit.

5. The lens unit as set forth in claim 4, satisfying the following condition:

$$v_{d-f3}<28$$

where $v_{d-f3}$ represents an Abbe number of said third lens included said front group.

6. The lens unit as set forth in claim 5, satisfying the following condition:

$$D_2/R_2<1.9$$

where $R_2$ (unit: mm) represents a radius of curvature at an intersection with an optical axis of an imageside surface of said first lens included in said front group, and $D_2$ (unit: mm) represents a diameter of a section of said image-side surface of said first lens included in said front group.

* * * * *